(12) United States Patent
Lattner et al.

(10) Patent No.: US 9,329,844 B2
(45) Date of Patent: May 3, 2016

(54) PROGRAMMING SYSTEM AND LANGUAGE FOR APPLICATION DEVELOPMENT

(71) Applicant: Apple Inc., Cupertino, CA (US)

(72) Inventors: Christopher A. Lattner, Los Gatos, CA (US); Douglas Gregor, Cupertino, CA (US); Ted Kremenek, Jr., Cupertino, CA (US); John McCall, Cupertino, CA (US); Joe Groff, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/502,697

(22) Filed: Sep. 30, 2014

(65) Prior Publication Data

US 2015/0347102 A1    Dec. 3, 2015

Related U.S. Application Data (60) Provisional application No. 62/005,918, filed on May 30, 2014.

(51) Int. Cl.
  *G06F 9/45*     (2006.01)
  *G06F 21/57*    (2013.01)
  *G06F 9/445*    (2006.01)

(52) U.S. Cl.
  CPC  *G06F 8/41* (2013.01); *G06F 8/443* (2013.01); *G06F 8/47* (2013.01); *G06F 8/54* (2013.01); *G06F 21/577* (2013.01); *G06F 2221/033* (2013.01)

(58) Field of Classification Search
  CPC .............. G06F 8/52; G06F 8/443; G06F 8/47
  USPC ....................................................... 717/146
  See application file for complete search history.

(56) References Cited

U.S. PATENT DOCUMENTS

| | | | |
|---|---|---|---|
| 5,812,851 A * | 9/1998 | Levy et al. ................. | 717/147 |
| 6,836,883 B1 * | 12/2004 | Abrams et al. ............. | 717/140 |
| 7,934,207 B2 | 4/2011 | Gustafsson et al. | |
| 8,341,614 B2 | 12/2012 | Garst, Jr. et al. | |
| 8,595,711 B2 | 11/2013 | Clifton et al. | |
| 8,806,457 B2 | 8/2014 | Porras et al. | |
| 2005/0015673 A1 | 1/2005 | Plesko et al. | |
| 2009/0254893 A1 * | 10/2009 | Ahuja et al. ............... | 717/152 |

(Continued)

FOREIGN PATENT DOCUMENTS

WO    WO 2004/036421 A2    4/2004

OTHER PUBLICATIONS

PCT International Search Report and Written Opinion of the International Searching Authority for PCT/US2015/030007, mailed Jul. 6, 2015.

(Continued)

*Primary Examiner* — John Chavis
(74) *Attorney, Agent, or Firm* — Blakely, Sokoloff, Taylor & Zafman LLP (57) ABSTRACT

In one embodiment, an improved programming system and language for application development is provided that combines elements of the C and Objective-C languages without the constraints imposed by a requirement to maintain compatibility with the C language. The language provides the functionality of the C language compatibility in certain areas to improve the inherent safety of software written in the language. The new language includes default safety considerations such as bounds and overflow checking.

22 Claims, 6 Drawing Sheets

(56) References Cited

U.S. PATENT DOCUMENTS

2010/0153912 A1    6/2010    Porras et al.
2012/0317553 A1*  12/2012   Schmidt ........................ 717/130

OTHER PUBLICATIONS

Lattner C., et al., "LLVM: A compilation Framework or Lifelong Program Analysis & Transformation", Second International Symposium on Code Generation and Optimization: Feedback-Directed and Runtime Optimization (CGO '04). Mar. 20-24, 2004, pp. 75-86.

Xi Wang et al., "Towards Optimization-Safe Systems: Analyzing the Impact of Undefined Behavior", Proceedings of the Twenty-Fourth ACM Symposium on Operating Systems Priniciples, SOSP '13, Nov. 2013, pp. 260-275.

Sumant Kowshik et al., Ensuring code safety without runtime checks for rea-time control systems, Proceedings of the 2002 International Conference on Compilers, Architecture, and Synthesis for embedded systems, Oct. 2002, pp. 288-297.

Jeffrey Dean et al., "Vortex: An Optimizing Compiler for Object-Oriented Languages", In ACM SIGPLAN Notices, vol. 31, No. 10, pp. 83-100. ACM, 1996.

Chris Arthur Lattner, "LLVM: An Infrastructure for Multi-Stage Optimization", 2002, 68 pages.

Chris Arthur Lattner, "Macroscopic Data Structure Analysis and Optimization", 2005, 225 pages.

Chris Arthur Lattner, "The Architecture of Open Source Applications", vol. 1, Chapter 11, LLVM, Jun. 8, 2011, 10 pages.

"Open64 Compiler Whirl Intermediate Representation", Aug. 3, 2007, 75 pages.

* cited by examiner

PROGRAMMING SYSTEM AND LANGUAGE FOR APPLICATION DEVELOPMENT

CROSS-REFERENCE

The present application claims the benefit of provisional application Ser. No. 62/005,918 filed May 30, 2014, which is hereby incorporated herein by reference in its entirety.

BACKGROUND OF THE DISCLOSURE

A software developer can use build automation tools and a compiler or interpreter provided by an integrated development environment to create a software product. When compiling a high-level program into a machine language, it is an established practice to translate the source program into one or more intermediate forms before finally translating the source program into the machine language. The various intermediate forms can be processed by various components of a compiler infrastructure. For example, LLVM (formerly Low Level Virtual Machine) is a compiler infrastructure that can provide the middle layers of a complete compiler system. LLVM is designed for compile-time, link-time, run-time, and "idle-time" optimization of programs written in arbitrary programming languages. LLVM is language agnostic and can be used with a variety of front ends.

One front end used by LLVM is Clang, which is a C language front-end for LLVM. Generically, the C language is a general-purpose programming language that has been closely associated with the UNIX operating system. However, the C language has found use in nearly all aspects of software development. Clang can be used as a front-end compiler for software written in Objective-C. Objective-C is a superset of the C programming language and provides object-oriented capabilities and a dynamic runtime. Objective-C inherits the syntax, primitive types, and flow control statements of C and adds syntax for defining classes and methods. Objective-C also adds language-level support for object graph management and object literals while providing dynamic typing and binding, deferring many responsibilities until runtime.

Objective-C is a 'strict superset' of C. The syntax for non-object-oriented operations, including primitive variables, pre-processing, expressions, function declarations, and function calls are identical to that of C, while the syntax for object-oriented features is an implementation of messaging derived from the Smalltalk object-oriented language. Accordingly, it is possible to compile any C program with an Objective-C compiler, and to freely include C code within an Objective-C class.

The C compatibility of Objective-C provides benefits and drawbacks. The C language is a relatively "low level" language in terms of high-level programming languages, and performs operations using similar objects as the underlying computer system, such as characters, numbers, and addresses. However, C is a weakly typed language that engages in inherently unsafe memory operations. Such features have historically provided a performance advantage to applications written in the C language, but can require extensive diligence by application developers to protect against unanticipated security vulnerabilities.

SUMMARY OF THE DESCRIPTION

In one embodiment, an improved programming system for application development is provided that includes a new programming language. In one embodiment, the programming system includes an integrated development environment with a compiler infrastructure that allows software in the new language to be mixed with existing software written in other languages. Existing software modules can be replaced with new modules written in the new language without harming the functionality of existing applications.

In one embodiment a non-transitory computer-readable medium with instructions stored therein cause a processing system including one or more processors to perform operations comprising receiving a first request to compile a first set of program instructions coded in a first high-level language. The first high-level language can be a C language based object-oriented programming language. The operations can further include receiving a second request to compile a second set of program instructions related to the first set of program instructions. The second set of instructions can be coded in a second high-level language that includes both object-oriented elements and procedural elements. The instructions in the second set of program instructions are not strictly compatible with the C programming language.

The operations can additionally include compiling the first set of program instructions and the second set of program instructions using a modular compilation system. The modular compilation system can include multiple front-end compilers, the first set of program instructions compiled into a first intermediate representation of the first set of program instructions and the second set of program instructions compiled into a second intermediate representation of the second set of program instructions.

In one embodiment, a system comprises one or more processors coupled to memory and one or more non-transitory storage devices coupled to the memory and the one or more processors. The storage device can include a first set of program instructions in a first high-level language and a second set of program instructions in a second high-level language. Additionally included is an application development system, which is stored on the one or more storage devices. The application development system can be configured to build an application using the first set of program instructions and the second set of program instructions. The application development system includes a modular compilation system having a first-front end compiler and a second front-end compiler, and additionally includes a linker to link symbolic references to functions in the first and second set of program instructions. The first high-level language can be a C language based object-oriented programming language. The second high-level language includes object-oriented elements and procedural elements and is not strictly compatible with the C programming language.

Other features of the present invention will be apparent from the accompanying drawings and from the detailed description, which follows. The above summary does not include an exhaustive list of all aspects of the present invention. It is contemplated that the invention includes all systems and methods that can be practiced from all suitable combinations of the various aspects summarized above, and also those disclosed in the Detailed Description section below.

BRIEF DESCRIPTION OF THE DRAWINGS

References to "one embodiment" or "an embodiment" indicate that a particular feature, structure, or characteristic described in conjunction with the embodiment can be included in at least one embodiment of the invention. The various embodiments are illustrated by way of example and not limitation. In the figures of the accompanying drawings, like references indicate similar elements.

DETAILED DESCRIPTION

Various embodiments and aspects of an improved programming system and language for application development will be described with reference to details discussed below. The new programming language builds upon elements provided by the C and Objective-C languages without the constraints imposed by C compatibility. The improved programming system and new language provides the functionality of the C language with improvements in certain areas to enhance the safety of software written in the language.

For example, the new language includes default safety considerations such as bounds and overflow checking that are not present in current programming languages based upon the C language. Numerous specific details are described below to provide a thorough understanding of various embodiments of the present invention. However, in certain instances, well-known or conventional details are not described in order to provide a concise discussion of embodiments described herein.

Overview of Language Characteristics

Embodiments of the programming system include an integrated development environment that provides support for a new language that adopts safe programming patterns and modern features beyond those provided by C and Objective-C. For example, Objective-C's named parameters and the dynamic object model are present in the new language, along with new features to simplify application development. An embodiment of the new language provides its own versions of fundamental C and Objective-C types, including "Int" for integers; "Double" and "Float" for floating-point values; "Bool" for Boolean values; and "String" for textual data. The new language also provides versions of the two primary collection types, "Array" and "Dictionary." Variables can be used to store and refer to values by an identifying name. Constants are also available that have functionality beyond those provided by constants in the C language. The language makes extensive use of constants when it is clear that a given value should not change during runtime.

Additionally, an embodiment of the new language introduces advanced types not found in Objective-C. These types include Tuples and Optionals. Tuples enable a developer to create and pass groupings of values. Tuples group multiple values into a single compound value. The values within a tuple can be of any type and do not have to be of the same type as each other. It is possible to name the individual elements in a tuple when the tuple is defined. Tuples are particularly useful as the return values of functions. In one embodiment, Tuples are primarily useful as temporary groups of related values, and may not be suited for the creation of complex data structures.

In one embodiment, an optional type is provided that handles the absence of a value. Optionals are a way to say either "there is a value, and it equals x" or "there isn't a value at all." Optionals do not exist in C or Objective-C. The nearest analogy in Objective-C is the ability to return nil from a method that would otherwise return an object, with nil meaning "the absence of a valid object." However, this only works for objects and does not work for structs, basic C types, or enumeration values. For these types, Objective-C methods typically return a special value (e.g., NSNotFound) to indicate the absence of a value. This assumes that the method's caller knows there is a special value to test against and remembers to check for it. To the contrary, optionals allow a developer to indicate the absence of a value of any type, without the use of special constants.

Data Types in the New Language

In one embodiment, the new language includes multiple forms of data types, including compound types and named types. A compound type is a type without a name, which is defined in the language itself. A named type is a type that can be given a particular name when it is defined. There are two compound types, a function type and a tuple type. The compound type may contain named types and other compound types. For example, the tuple type (Int, (Int, Int)) contains two elements. The first is the named type Int and the second is another compound type (Int, Int).

As opposed to compound types, named types are modularly defined via standard libraries. Named types include classes, structures, enumerations, and protocols, including those defined by a developer during application development using the programming system and language. In addition to user-defined named types, the new language standard libraries define commonly used data types, including those that represent arrays, dictionaries, optional values, as well as types that represent numbers, characters, and strings, which would be basic or primitive types in other languages. Because the basic types are named types, their behavior can be extended to suit the needs of the developer using a type extension.

Type Safety and Type Inference

The new language allows a developer to be explicit about the types of values the software instructions can work with. If part of the software expects a String, type safety prevents instructions from passing an Int (e.g., integer) by mistake. This enables a developer that is authoring software in the new language to catch and fix errors as early as possible in the development process.

An additional type safety feature is compile-time type checking, which can be used to assist developers in avoiding programming errors when working with different types of values. Values are not implicitly converted to another type. If a developer desires to convert a value of a first type to a value having a second type, the developer must explicitly define an instance of the desired type.

Additionally, the type checking applied for some language components enables the compiler for the new language to perform compile-time type inference for other language components. For example, the compiler can infer the types to assign to some components, such as constants and variables, based on the values used at initialization. A compiler can then infer the type to assign to the constant or variable at compile time.

Strings and Characters

The new language's String and Character types provide a fast, Unicode-compliant way to work with text within software instructions. The syntax for string creation and manipulation is lightweight and readable, with a similar syntax to C strings. String concatenation is as simple as adding together two strings with the '+' operator, and string mutability is managed by choosing between a constant or a variable, just like any other value in the new language.

Additionally, string interpolation can be used to dynamically generate strings based on a runtime value assigned to other variables. For example, if a section of source code were to define an integer value of 3 to an variable named 'a' and an integer value of 5 to a variable named 'b,' a 'mathResult' string can be defined as "\(a) times \(b) is \(a*b)." As a result of the assignment, mathResult will be assigned the interpolated string value of "3 times 5 is 15." This feature enables a developer to easily defined complex strings based on multiple factors than can be evaluated at runtime.

Type Casting

The new language is designed to encourage developers to be explicit about the types on which a particular set of instructions is designed to operate. Operations can be performed conditioned on the data type of the item. To access an item as a data type other than the assigned type the data item is accessed using an explicit type cast. Type checking and type casting in the new language are implemented with the 'is' and 'as' operators. A developer can use the 'is' operator to check if an item is of a certain type. The type check operator returns true if the instance is of that subclass type and false if it is not. A developer can use the 'as' operator to cast an item to a different type. Type casting does not modify the instance of the item or change the values of the item. Instead, the item is accessed as an instance of the type to which it is cast.

Collection Types

The new language provides two collection types, known as arrays and dictionaries, for storing collections of values. Arrays store ordered lists of values of the same type. Dictionaries store unordered collections of values of the same type, which can be referenced and looked up through a unique identifier (also known as a key).

In one embodiment, arrays and dictionaries are always clear about the types of values and keys that they can store. This means that a software developer cannot insert a value of the wrong type into an array or dictionary by mistake. It also means software developers can be confident about the types of values retrieved from an array or dictionary. The use of explicitly typed collections is designed to enable software to be explicit about data types and to enable developers to catch type mismatches early in the software development cycle. In one embodiment, the new language includes automatic bounds checking of collection types to prevent accessing memory outside of the bounds of the collection.

Subscripts

Classes, structures, and enumerations can define subscripts, which are shortcuts for accessing the member elements of a collection, list, or sequence. Software can use subscripts to set and retrieve values by index without needing separate methods for setting and retrieval. For example, a developer can author software which access elements in an Array instance as someArray[index] and elements in a Dictionary instance as someDictionary[key].

Developers can define multiple subscripts for a single type, and the appropriate subscript overload to use is selected based on the type of index value passed to the subscript. Subscripts are not limited to a single dimension, and subscripts can be defined with multiple input parameters to suit the needs of a custom type.

Functions

Functions are self-contained segments of code that perform a specific task. The new language's unified function syntax is flexible enough to express anything from a simple C-style function with no parameter names to a complex Objective-C-style method with local and external parameter names for each parameter. Parameters can provide default values to simplify function calls and can be passed as in-out parameters, which modify a passed variable once the function has completed its execution.

Every function in the new language has a type consisting of the function's parameter types and return type. A developer can use this type like any other type in the new language, which makes it easy to pass functions as parameters to other functions, and to return functions from functions. Functions can also be written within other functions to encapsulate useful functionality within a nested function scope. When functions are assigned to variables, the type of the variable receiving the assignment can be inferred based on the type of the function that is being assigned.

Closures

Closures are self-contained blocks of functionality that can be passed around and used in software. Closures in the new language are similar to blocks in C and Objective-C and to lambdas in other programming languages. Closures can capture and store references to any constants and variables from the context in which they are defined. This is known as closing over those constants and variables, hence the name "closures."

Global and nested functions, as introduced in Functions, are actually special cases of closures. Closures take one of three forms, global functions, nested functions, and closure expressions. Global functions are closures that have a name, and do not capture any values. Nested functions are closures that have a name and can capture values from their enclosing function. Closure expressions are unnamed closures written in a lightweight syntax that can capture values from their surrounding context. The new language's closure expressions have a clean, clear style, with optimizations that encourage brief, clutter-free syntax in common scenarios. These optimizations include inferring parameter and return value types from context, implicit returns from single-expression closures, shorthand argument names, and trailing closure syntax.

Classes and Structures

Classes and structures are general-purpose, flexible constructs that become the building blocks of a program's code. A developer defines properties and methods to add functionality to classes and structures by using the same syntax as for constants, variables, and functions.

Unlike other programming languages, the new language does not require the creation of separate interface and implementation files for custom classes and structures. In the new language, a class or a structure is defined in a single file, and the external interface to that class or structure is automatically made available for other code to use.

An instance of a class is traditionally known as an object. However, the new language classes and structures are much closer in functionality than in other languages, and much of this chapter describes functionality that can apply to instances of either a class or a structure type. Because of this, the more general term instance is used.

Enumerations

Enumerations define multiple related values of a similar kind and are enabled to work with those values in a type-safe way within software. While enumerations in the C language assign related names to a set of integer values, enumerations in the new language are more flexible, and do not have to provide a value for each member of the enumeration. If a value (known as a "raw" value) is provided for each enumeration member, the value can be a string, a character, or a value of any integer or floating-point type.

Alternatively, enumeration members can specify associated values of any type to be stored along with each different member value, in a similar way to unions or variants in other languages. Developers can define a common set of related members as part of one enumeration, each of which is associated with a different value of an appropriate type.

Enumerations in the new language are first-class types in their own right. They adopt many features traditionally supported only by classes, such as computed properties to provide additional information about the enumeration's current value, and instance methods to provide functionality related to the values the enumeration represents. Enumerations can also define initializers to provide an initial member value; can be extended to expand their functionality beyond their original implementation; and can conform to protocols to provide standard functionality.

Nested Types

The new language enables developers to define nested types to support enumerations, classes, and structures within the definition of the supported. As enumerations can be created to support a specific class or structure's functionality, it can be convenient to define utility classes and structures purely for use within the context of a more complex type. To nest a type within another type, a developer can write the type definition within the outer braces of the type it supports, to indicate to the compiler that the nested type is specific to the type into which the nested type is nested. As many levels of nesting as required by the developer can be used.

Extensions

Extensions add new functionality to an existing class, structure, or enumeration type. This includes the ability to extend types for which a developer does not have access to the original source code, which is known as retroactive modeling. Extensions are similar to categories in Objective-C. However, unlike Objective-C categories, the new language extensions do not have names.

Extensions in the new language can add computed properties and computed static properties, define instance methods and type methods, provide new initializers, define subscripts, define and use new nested types, and make an existing type conform to a protocol.

Protocols

A protocol defines a blueprint of methods, properties, and other requirements that suit a particular task or piece of functionality. In one embodiment, the protocol does not provide an implementation for the requirements, but describes the composition of an implementation. The protocol can then be adopted by a class, structure, or enumeration to provide an actual implementation of those requirements. Any type that satisfies the requirements of a protocol is said to conform to that protocol. In one embodiment, protocols can require that conforming types have specific instance properties, instance methods, type methods, operators, and subscripts.

Properties

Properties associate values with a particular class, structure, or enumeration. Stored properties store constant and variable values as part of an instance, whereas computed properties calculate (rather than store) a value. Classes, structures, and enumerations provide computed properties. Only classes and structures provide stored properties.

Stored and computed properties are usually associated with instances of a particular type. However, properties can also be associated with the type itself. Such properties are known as type properties.

In addition, developers can define property observers to monitor changes in a property's value, which can be responded to with custom actions. Property observers can be added to stored properties defined by the software developer, and also to properties that a subclass inherits from its superclass.

Methods

Methods are functions that are associated with a particular type. Classes, structures, and enumerations can all define instance methods, which encapsulate specific tasks and functionality for working with an instance of a given type. Classes, structures, and enumerations can also define type methods, which are associated with the type itself. Type methods are similar to class methods in Objective-C.

In the new language, structures and enumerations can define methods, which is a major distinction over the C and Objective-C languages, in which only classes can define methods. In the new language, developers can choose whether to define a class, structure, or enumeration, and still have the flexibility to define methods on the type developers create.

Inheritance

A class can inherit methods, properties, and other characteristics from another class. When one class inherits from another, the inheriting class is known as a subclass, and the class it inherits from is known as its superclass. Inheritance is a fundamental behavior that differentiates classes from other types in the new language.

Classes in the new language can call and access methods, properties, and subscripts belonging to their superclass and can provide their own overriding versions of those methods, properties, and subscripts to refine or modify their behavior. The new language helps to ensure overrides are correct by checking that the override definition has a matching superclass definition.

Classes can also add property observers to inherited properties in order to be notified when the value of a property changes. Property observers can be added to any property, regardless of whether it was originally defined as a stored or computed property.

Initialization/De-Initialization

Initialization is the process of preparing an instance of a class, structure, or enumeration for use. This process involves setting an initial value for each stored property on that instance, and performing any other setup or initialization that is required before the new instance is ready for use.

Developers implement this initialization process by defining initializers, which are specialized methods that can be called to create a new instance of a particular type. Unlike Objective-C, initializers in the new language do not return a value. The primary role of the initializer is to ensure that new instances of a type are correctly initialized before they are used for the first time. Instances of class types can also implement a de-initializer, which performs any custom cleanup just before an instance of that class is deallocated. A de-initializer is called immediately before a class instance is deallocated. De-initializers are written with the deinit keyword, similar to how initializers are written with the init keyword. De-initializers are only available on class types.

Automatic Reference Counting

The new language uses Automatic Reference Counting (ARC) to track and manage an application's memory usage. In most cases, this means that memory management "just works" in the new language, and developers do not need to explicitly perform memory management. ARC automatically frees up the memory used by class instances when those instances are no longer needed. Every time a new instance of a class is created, ARC allocates a chunk of memory to store information about that instance. This memory holds information about the type of the instance, together with the values of any stored properties associated with that instance. When an instance is no longer needed, ARC frees up the memory used by that instance so that the memory can be used for other purposes instead. This ensures that class instances do not take up space in memory when they are no longer needed.

However, if ARC were to deallocate an instance that was still in use, it would no longer be possible to access that instance's properties, or call that instance's methods, likely leading to an application crash. To make sure that instances don't disappear while they are still needed, ARC tracks how many properties, constants, and variables are currently referring to each class instance. ARC will not deallocate an instance as long as at least one active reference to that instance still exists. To make this possible, whenever a developer assigns a class instance to a property, constant, or variable, that property, constant, or variable makes a strong reference to the instance. The reference is called a "strong" reference because it keeps a firm hold on that instance, and does not allow it to be deallocated for as long as that strong reference remains.

Control Flow

The new language provides all the familiar control flow constructs of C-like languages. These include for and while loops to perform a task multiple times, if and switch statements to execute different branches of code based on certain conditions, and statements such as break and continue to transfer the flow of execution to another point in software. In addition to the traditional for-condition-increment loop found in the C language, the new language adds a for-in loop that makes it easy to iterate over arrays, dictionaries, ranges, strings, and other sequences.

The new language's switch statement is also considerably more powerful than its counterpart in the C language. The cases of a switch statement do not "fall through" to the next case in the new language, avoiding common C language errors that are caused by missing break statements. Cases can match many different types of pattern, including range matches, tuples, and casts to a specific type. Matched values in a switch case can be bound to temporary constants or variables for use within the case's body, and complex matching conditions can be expressed with a where clause for each case.

Control Flow Using Optional Values

Optional chaining is a way to query and call properties, methods, and subscripts on an optional that might currently be nil. An optional value either contains a value or contains nil to indicate that the value is missing. A '?' applied to a type indicates that the type may have a value, or that the value may optionally be nil (e.g., contains no value). Control flow can be performed using optional values, such that if an optional contains a value, the property, method, or subscript call succeeds; if the optional is nil, the property, method, or subscript call returns nil. Multiple queries can be chained together, and the entire chain fails gracefully if any link in the chain is nil.

Generics

Generic code enables a developer to write flexible, reusable functions and types that can work with any type, subject to defined requirements. A developer can write code that avoids duplication and expresses its intent in a clear, abstracted manner. Generics are one of the most powerful features of the new language, and much of the standard library of the new language is built with generic code. For example, the new language's Array and Dictionary types are generic collections. A developer can create an array that holds Int values, or an array that holds String values, or indeed an array for any other type that can be created in the new language. Similarly, developers can create a dictionary to store values of any specified type, and there are no limitations on what that type can be.

Operators

An operator is a special symbol or phrase that is used to check, change, or combine values. The new language supports most standard C operators and improves several capabilities to resolve common issues that arise during software development. For example, the assignment operator (=) does not return a value, to prevent it from being mistakenly used when the equality operator (==) is intended. Arithmetic operators (e.g., +, −, *, /, %, etc.) detect and disallow value overflow, to avoid unexpected results when working with numbers that become larger or smaller than the allowed value range of the type that stores them. Additionally, remainder (%) calculations can be performed on floating-point numbers. Also, the new language provides two range operators, the half-closed (e.g., a . . . b) and closed (e.g., a . . . b) range operators, which are not found in the C language. The range operators can be used as a shortcut for expressing a range of values. An embodiment of the new language allows the creation of custom operators and the behavior of standard operators can be defined for custom data types.

In addition to basic operators, an embodiment of the new language provides several advanced operators that perform more complex value manipulation. The advanced operators include bitwise and bit shifting operators. Unlike C, arithmetic operators in the new language do not overflow by default. Overflow behavior is trapped and reported as an error. To opt in to overflow behavior, the new language provides a second set of arithmetic operators that overflow by default, such as the overflow addition operator (&+). In one embodiment, overflow operators begin with an ampersand (&). Additionally, the new language enables the ability to define custom operators and implement the standard operators for custom data types.

Access Control

One safety mechanism included in the new language is source file and module based access control. Access control can be used to restrict access to functionality that is provided in portions of software. A developer can assign specific access levels to individual types (classes, structures, and enumerations), as well as to properties, methods, initializers, and subscripts belonging to those types. Protocols can be restricted to a certain context, as can global constants, variables, and functions. Additionally, default access levels are provided in differing scenarios, such that developers can take advantage of some level of default protection without requiting any explicit access control definitions in software.

In one embodiment, the access control model implemented in the new language is based on a module and source file concept. A module is a single unit of code distribution, such as a framework or application that is built and shipped as a single entity and that can be imported by another module. Each build target (e.g., application, framework, etc.) can be treated as a separate module. Alternatively, a source file is a single source code file within a module.

In one embodiment, three different access levels are provided: public, internal, and private. The access levels are relative to the source file in which an entity is defined and also relative to the module into which the source file is integrated.

Public access enables entities to be used within any source file from their defining module, and also in a source file from another module that imports the defining module. For example, a publically exposed interface to a framework will be declared as public. Internal access enables entities to be used within any source file from their defining module, but not in any source file outside of that module. Generally, the internal structure of a framework is defined as internal. Private access restricts the use of an entity to the defining source file of the entity. Logical entities that are defined in other source files, even within the same module, will not have access to private entities. Accordingly, entities in the new language cannot be defined in terms of entities having a more restrictive access level. For example, a public variable cannot be defined as having an internal or private type, as the type might not be available everywhere that the public variable is used. A function cannot have a higher access level than its parameter types and return type because the function could be used in situations where its constituent types are not available to the surrounding code.

Building Mixed Language Applications Using the Programming System

In one embodiment, the new language is designed to provide seamless compatibility with existing software development environments and frameworks used with Objective-C. A developer can use Objective-C code (ranging from system frameworks to custom code) in the new language, and the developer can use the new language in Objective-C, even though the new language is not strictly compatible with the C language. This makes the new language an easy and powerful tool to integrate into an app development workflow designed around existing application frameworks. Exemplary Objective-C frameworks that may be used with the new language are the Cocoa and Cocoa touch frameworks for the OSX and iOS operating systems, all from Apple Inc., of Cupertino, Calif. An exemplary components of the programming system described herein is the Xcode Integrated Development Environment also from Apple Inc. An exemplary embodiment of the new language described herein is the Swift programming language, also from Apple Inc. However, these examples are not intended to be limiting.

In one embodiment, Objective-C code can be accessed to create an application based on the new language (e.g., Swift) using an integrated development environment (e.g., Xcode). An Objective-C framework (or C library) that's accessible as a module can be imported directly into the new language. The new language is interoperable with existing frameworks in Objective-C, which allows classes coded in the new language to be used with Objective-C, to leverage existing development frameworks and practices along side new code written in the new language.

In one embodiment, mixed-language applications can be developed that contain existing Objective-C based software, as well as software in the new language. The software modules can communicate and exchange information. The compatibility eases the difficulty of migration from existing software to new software written in the new language by enabling existing modules to be replaced with new modules written in the new language without compromising application functionality. In particular, a portion of an application's functionality can be implemented using the new language while other portions of the application continue to be coded in, for example, Objective-C.

In one embodiment, mixed language frameworks can be developed that include modules coded in the new language alongside modules coded in an existing C-compatible language. The modules of the mixed language framework can be accessed from client software developed in both the C-compatible language, as well as modules developed in the new language. When cross-importing modules coded in differing languages the programming system can automatically generate header files that incorporate sufficient bridging information to exposes functionality across modules coded in differing languages. In one embodiment, a bridging header file is automatically generated that includes the necessary information required to perform link time symbol resolution with external modules coded in a differing language. Mixed language development is enabled in part by the modular compiler system used by the programming system described herein.

Exemplary Compiler System

In one embodiment, compilation of the new language can be performed within an integrated development environment using a modular compiler system, such the system enabled by the LLVM compiler infrastructure. In one embodiment, a front-end compiler such as the Clang front-end compiler can be used.

Figure 1:
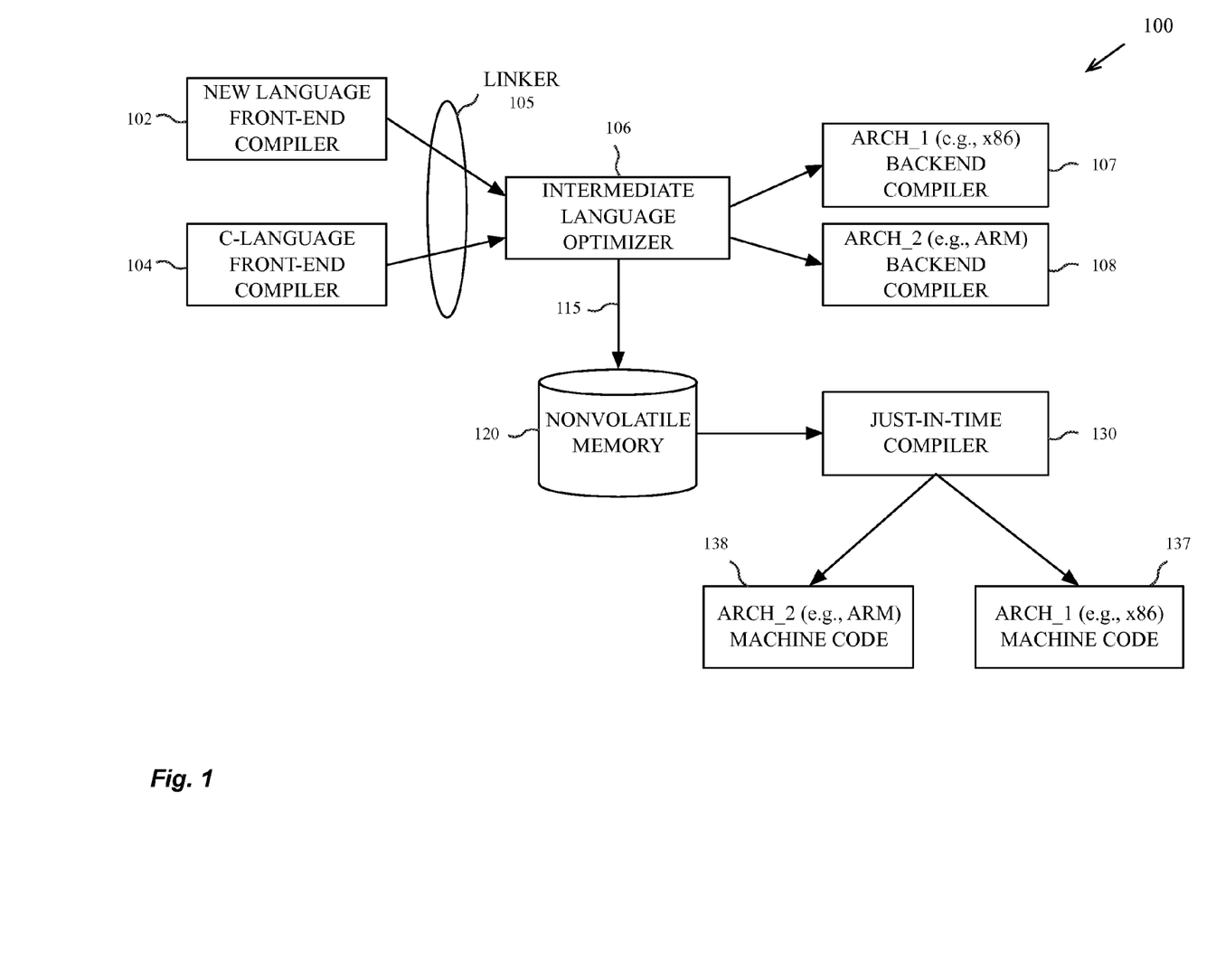
FIG. 1 is a block diagram illustrating an embodiment of a modular compiler system with support for the new language.

FIG. 1 is a block diagram illustrating an embodiment of a modular compiler system 100 with support for the new language. In one embodiment the modular compiler system 100 includes multiple front-end compilers, including a first front-end compiler 102 having support for the new language and a second front-end compiler 104 having C-language support (e.g., C, Objective-C). Each of the multiple front-end compilers can convert source code written in a particular high-level language into a common intermediate representation, such as, for example, the LLVM intermediate representation. A linker 105 can link function and object references between the code modules compiled by the front-end compilers before an intermediate language optimizer 106 can then perform cross-language optimization on the intermediate representation. In one embodiment, the intermediate language optimizer 106, based on one or more requested compile-time optimizations, performs one or more additional link-time optimizations on the resulting intermediate representations output by the multiple front-end compilers. (e.g., cross-module dead code stripping, etc.). Thus, multiple software modules written in multiple high-level source code languages can be optimized at a common point and then cross-optimized, even though the modules were each coded in different high-level languages.

The intermediate representation can be stored in a text-based intermediate language or converted into a bitcode representation. The intermediate representation can then be converted by one or more back-end compilers into a machine-language format that is specific to a particular processor architecture. For example, a back-end compiler 107 for a first architecture (e.g., an x86 compatible instruction set architecture) can be used to compile machine code for execution on processors having support for the first architecture, while a back-end compiler 108 for a second architecture (e.g., an ARM compatible instruction set architecture) can be used to compile machine code for execution on processors having support for second architecture.

In one embodiment, an optimized intermediate representation can be stored in a binary format in nonvolatile memory 120 of a data processing system for later use. When functions defined in the intermediate language are referenced at runtime, any function that has not yet been converted to architecture specific machine code can be compiled by a just-in-time compiler 130 into machine code for an architecture supported by the compilation system (e.g., any one or more of the first architecture 137 or the second architecture 138).

For additional information on the LLVM compiler infrastructure, see Lattner, *Macroscopic Data Structure Analysis And Optimization*, University of Illinois at Urbana-Champaign, 2005.

Exemplary System Runtime Environment

Figure 2:
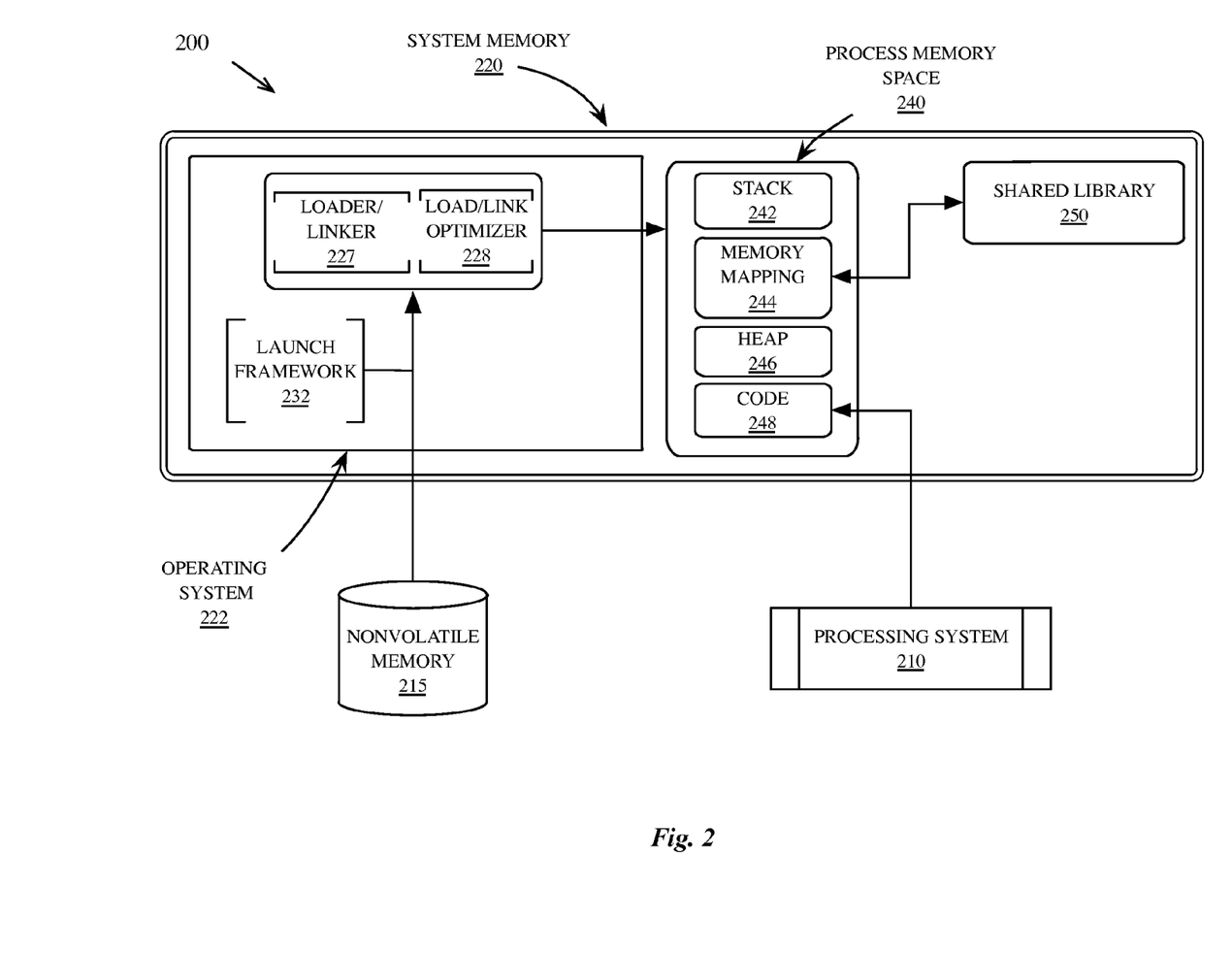
FIG. 2 is a block diagram of one embodiment of system runtime environment of a data processing system, according to an embodiment.

FIG. 2 is a block diagram of one embodiment of system runtime environment 200 of a data processing system, according to an embodiment. The data processing system contains a processing system 210 including one or more processors, which each can have one or more processor cores. The processing system 210 can direct an operating system 222 running in system memory 220 to load an application developed via an embodiment of the programming system and language for application development as described herein.

In one embodiment, the operating system 222 has an application launch framework 232, which launches applications stored in the nonvolatile memory 215 of the data processing system. In one embodiment, the operating system 222 includes a loader/linker 227 having a load/link optimizer 228 to perform additional link-time and load-time optimizations while loading components of the application into process memory space 240. An example link-time optimization is to bypass the loading of a program function if the function is not called by any other function (e.g., the linker does not resolve any symbols to the function). Should the function become relevant at a later time, the loader/linker 227 may load the function in memory. In one embodiment some modules can be stored as bitcode on nonvolatile memory 215 and a final conversion to machine code is deferred until the module is required by other components of an application. The bitcode can then be compiled by a just-in-time compiler (e.g., just-in-time compiler 130 as in FIG. 1) and loaded into process memory space 240.

The process memory space 240 includes runtime components of the application, including a stack segment 242, a heap segment 246, and a code segment 248. In one embodiment the runtime environment includes a virtual memory system that allows an address space in nonvolatile memory 215 to be mapped into system memory 220. In particular, the code segment 248 of the application can be loaded via a virtual memory mapping from nonvolatile memory 215. Once loaded, the processing system 210 can execute the compiled instructions in the code segment 248.

In one embodiment, the process memory space 240 includes one or more memory mappings 244 from other areas of system memory 220, including memory spaces assigned to other applications or processes. For example, a shared library 250 provided by the system can be loaded into memory and mapped into a memory mapping 244 in the process memory space of the application that is built by an embodiment of the programming system and language for application development.

Exemplary Logic for Building Applications

The processes depicted in FIG. 3 and FIG. 4 below can be performed by processing logic comprising hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

Figure 3:
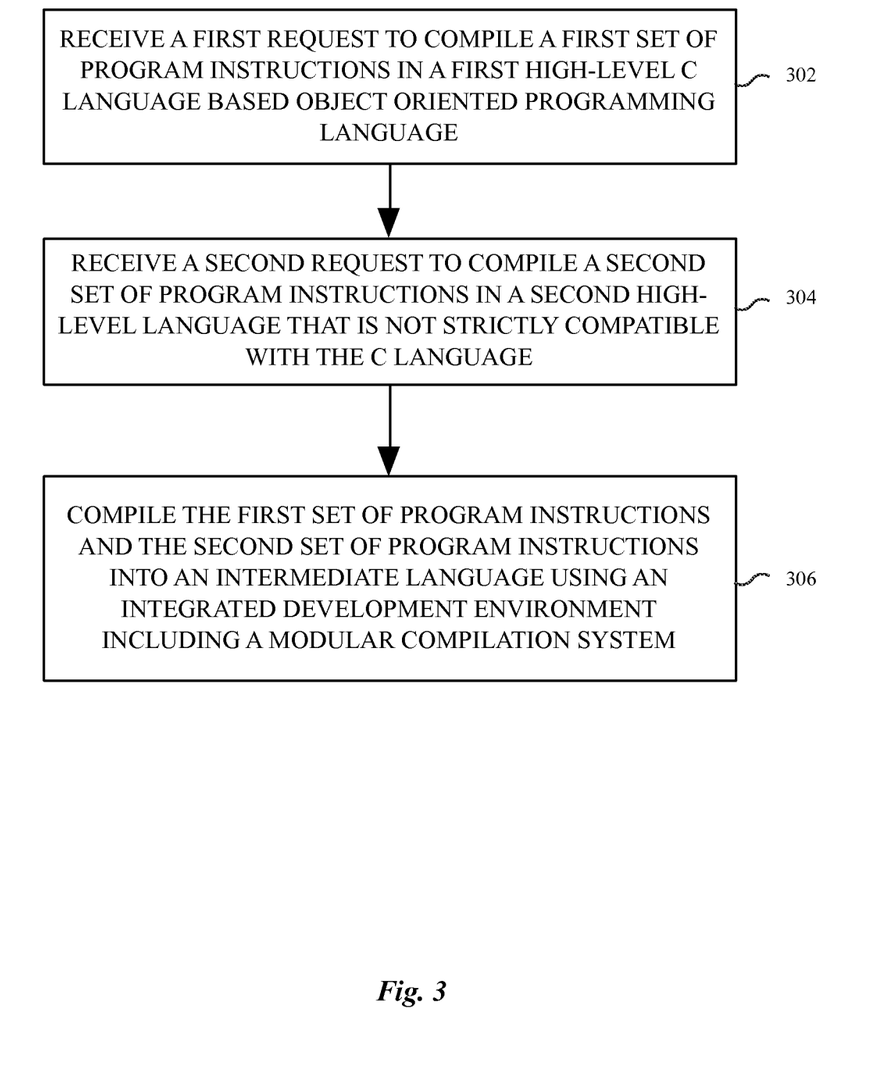
FIG. 3 is a flow diagram of logic for compiling multiple sets of instructions in multiple languages into a common language, according to an embodiment.

FIG. 3 is a flow diagram of logic for compiling multiple sets of instructions in multiple languages into a common language, according to an embodiment. In one embodiment, an application can include multiple modules developed using multiple programming languages. As shown at block 302, compilation of instructions for such application can include receiving a first request to compile a first set of program instructions in a first high-level language. Compilation can also include receiving a second request to compile a second set of program instructions in a second high-level language, as shown at block 304. In one embodiment the first high-level language is a C language based high-level object oriented language, such as the Objective-C programming language. The second language can be a high-level programming language that is not strictly compatible with the C language, such as a variant of the new language described herein. In one embodiment, the second language is the Swift High-Level Programming Language.

As shown at block 306, the first set of program instructions and the second set of program instructions can be compiled into an intermediate language or intermediate representation using an integrated development environment including a modular compilation system. For example, the Xcode integrated can use a modular compilation system, such as LLVM, to compile the first and second set of program instructions into an intermediate language, or an intermediate representation, such as the LLVM intermediate representation, although other integrated development environments, compilers, and intermediate representations can also be used.

Figure 4:
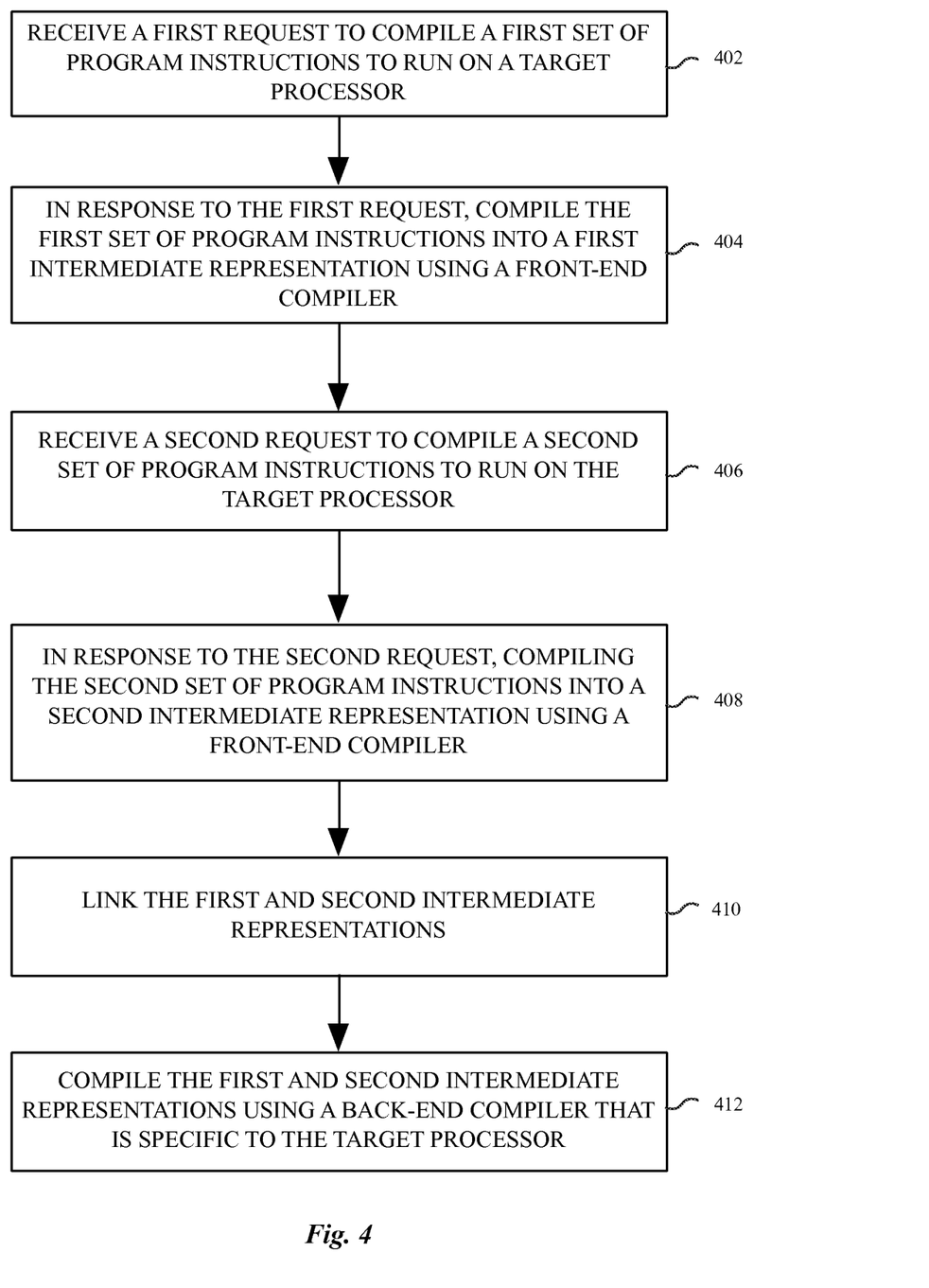
FIG. 4 is a flow diagram of logic flow for compiling a mixed language application including instruction written in the new language, according to an embodiment.

FIG. 4 is a flow diagram of logic flow for compiling a mixed language application including instruction written in the new language, according to an embodiment. In one embodiment, as shown at block 402, compilation operations include receiving, by a data processing system, a request to compile a first set of program instructions to run on a target processor. The target processor can be the host data processing system for the compiler. In one embodiment, the request is a cross-compile request where the target processor is different than the host processor or processors of the data processing system. In response to the request, as shown at block 404, the system can compile the first set of program instructions into a first intermediate representation using a front-end compiler. In one embodiment, the front-end compiler is specific to C languages, such as the C language, C++, or Objective-C. In one embodiment, the front-end compiler is specific to languages that are strictly compatible with the C programming language, such as ANSI C or Objective-C. In one embodiment, the front-end compiler includes support for non C-based languages.

As shown at block 406, the operations additionally include receiving a second request to compile a second set of program instructions to run on the target processor. The second set of program instructions can be related to the first set of program instructions. For example, the first set of program instructions can be an Objective-C module of an application, while the second set of program instructions can be a new module for the application written in the new programming language. In one embodiment, the second language is not strictly compatible with the C programming language, such that a compiler that is strictly compatible with the C language will not compile instructions written in the second language. In one embodiment the second language includes object-oriented elements, procedural elements, and performs bounds and overflow checking by default.

In one embodiment, as shown at block 408, the operations additionally include compiling the second set of program instructions in response to the second request. In one embodiment, the second set of program instructions are compiled using a language-specific front-end compiler that is specific to the new programming language. In one embodiment, the second set of program instructions is compiled with a front-end compiler that includes support for the new language, as well as other languages, such as languages based on the C programming language. The second set of program instructions can be compiled into a second intermediate representation of the second set of program instructions.

In one embodiment, as shown at block 410, additional operations can be performed, including linking the first and second intermediate representations using a linker. In one embodiment, the linker and the front-end compilers are components of a modular LLVM compiler infrastructure. As shown at block 412, an embodiment, can compile the first and second intermediate representations using a back-end compiler that is specific to the target processor, to allow rapid re-targeting of the program different types of processors and data processing systems.

Figure 5:
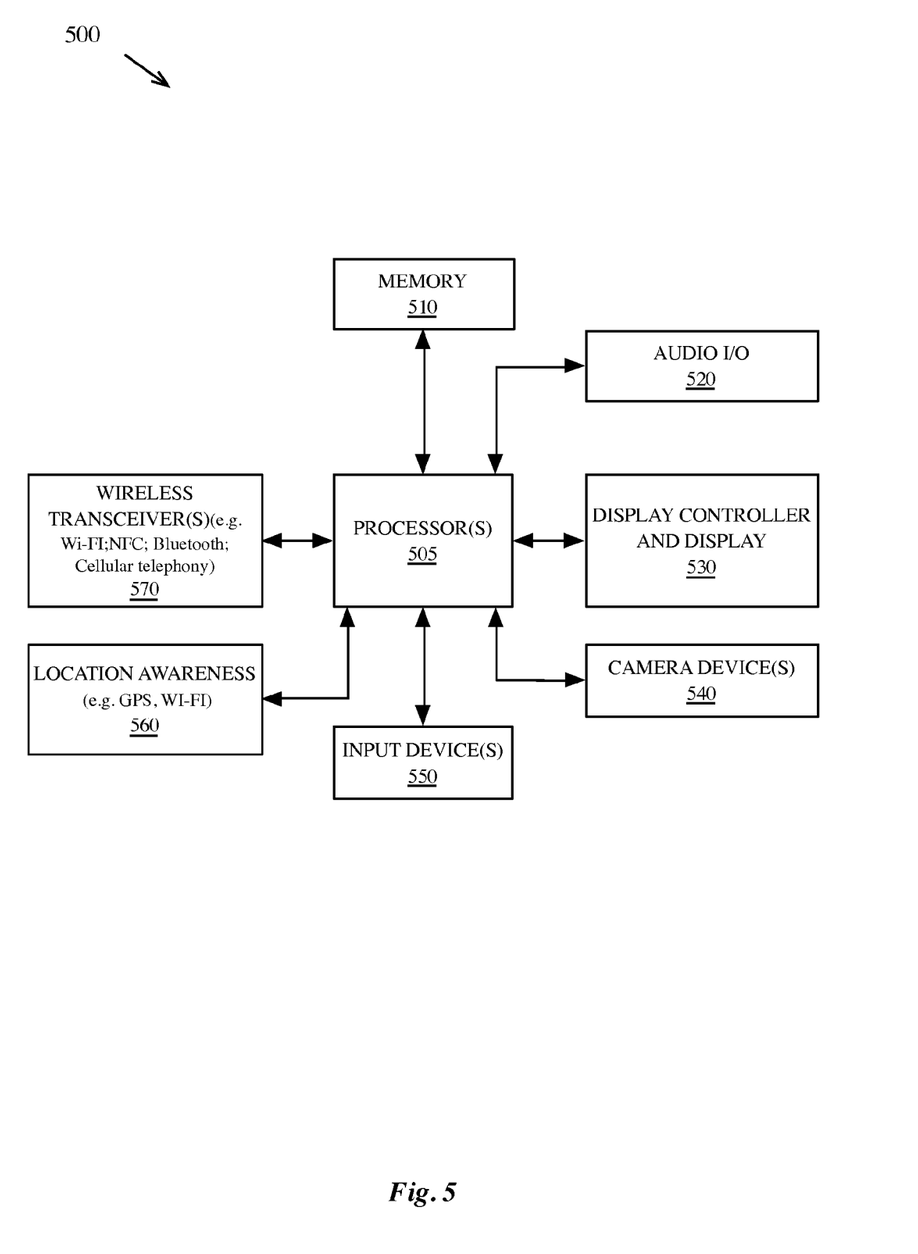
FIG. 5 shows a block diagram illustrating an exemplary data processing system suitable for executing applications targeted at the mobile or handheld device space, according to an embodiment.

FIG. 5 shows a block diagram illustrating an exemplary data processing system suitable for executing applications targeted at the mobile or handheld device space, according to an embodiment. The data processing system 500 may be a system on a chip integrated circuit suitable for use in handheld or mobile devices. One or more buses or interfaces that are not shown can be used to interconnect the various components, as known in the art. An electronic device constructed using the illustrated data processing system 500 may include additional or fewer components than shown.

The system can include includes a processing system 505 having one or more microprocessors and memory 510 for storing data and programs for execution by the processing system 505. An audio I/O subsystem 520 is included, which may include a microphone and a speaker for playing back music. The audio I/O subsystem 520 can also provide telephone functionality through the speaker and microphone.

A display controller and display device 530 can be included to provide a graphical user interface for the user, and a wireless transceiver 570 may be available to transmit and receive data via one or more wireless technologies, such as Wi-Fi, infrared, Bluetooth, or one or more variants of wireless cellular technology. The system 500 can contain one or more camera devices 540 in both a front and rear facing configuration, though similarly configured systems each with only a front facing camera or rear facing camera can be one of many optimal configurations. The data processing system 500 also includes one or more input devices 550 to enable a user to provide input to the system. Input devices may include a keypad or keyboard, alone or in conjunction with a touch or multi touch panel that is overlaid on the display device 530. The display device and touch panel can be adjusted in real time using factory-generated calibration data described herein. The data processing system 500 can also include a device for providing location awareness services, such as a Global Positioning System (GPS) device 560 or its equivalent.

Figure 6:
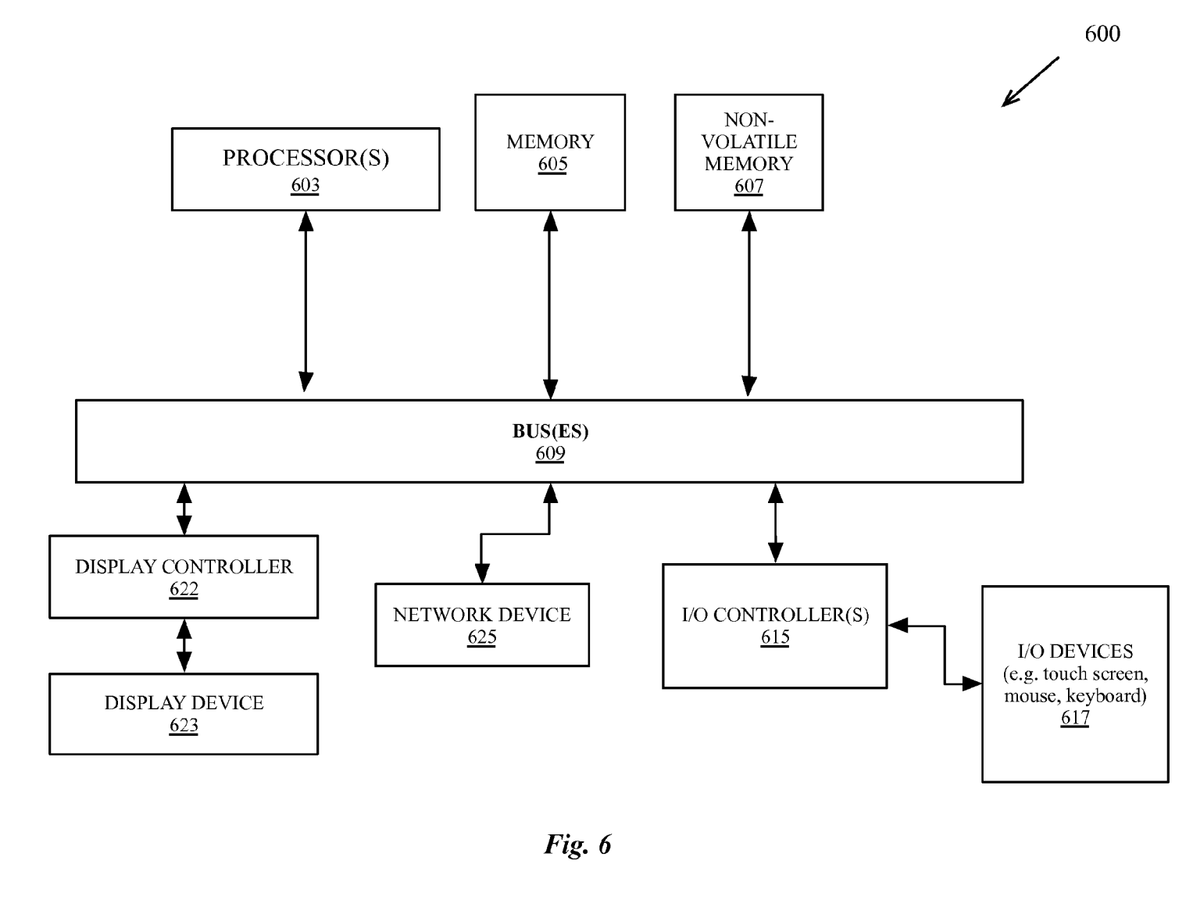
FIG. 6 shows a block diagram illustrating an additional exemplary data processing system, according to an embodiment.

FIG. 6 shows a block diagram illustrating an additional exemplary data processing system suitable for use within a workstation, a mobile workstation or a server, according to an embodiment. The data processing system 600 includes one or more buses 609 to interconnect the various components of the system. One or more processors 603 containing one or more processor cores are coupled to the one or more buses 609. Memory 605 may be volatile Sequential DRAM, nonvolatile RAM or may be flash memory or other types of semiconductor memory. The memory 605 can couple to the one or more buses 609 using techniques known in the art.

The data processing system 600 can also include nonvolatile memory 607 for data storage, which may be a hard disk drive, flash memory, optical memory, other types of memory systems that maintain data after all power is removed from the system. The nonvolatile memory 607 and the memory 605 can both couple to the one or more buses 609 using known interfaces and connection techniques. A display controller 622 is coupled to the one or more buses 609 in order to receive display data to be displayed on a display device 623. The display device 623 can include an integrated touch input to provide a touch screen. The data processing system 600 can also include one or more I/O controllers 615 to provide interfaces for one or more I/O devices, including touch screens, touch pads, joysticks, one or more mouse inputs, and other input devices including those known in the art. The I/O controller can also provide interfaces for one or more output devices (e.g., speakers). The input/output devices 617 may couple through one or more I/O controllers 615. Additionally, one or more network interfaces 625 can also be coupled to the one or more buses to provide access to one or more networks.

While FIG. 6 shows that the nonvolatile memory 607 and the memory 605 are coupled to the one or more buses directly rather than through a network interface, it will be appreciated that the data processing system can utilize a nonvolatile memory which is remote from the system, such as a network storage device which is coupled to the data processing system through a network interface such as a modem or Ethernet interface or wireless interface, such as a wireless Wi-Fi transceiver or a wireless cellular telephone transceiver or a combination of such transceivers. As is known in the art, the one or more buses 609 may include one or more bridges or controllers or adapters to interconnect between various buses. In one embodiment, the I/O controller 615 includes a USB adapter for controlling USB peripherals and can control an Ethernet port or a wireless transceiver or combination of wireless transceivers.

The techniques and methods described herein may be carried out in a data processing system in response to its processor executing a sequence of instructions contained in a volatile, non-transitory memory such as the memory 605 or the nonvolatile memory 607 or a combination of such memories. However, the techniques are not limited to any specific combination of hardware circuitry and software, or to any particular source for the instructions executed by the data processing system associated an apparatus for performing one or more of the operations described herein. In various embodiments, software-instructions stored on a machine-readable storage medium can be used in combination with hardwired circuitry, such as specialized processing logic or general purposes processing logic configured to execute instructions from a non-transitory machine-readable storage medium. Non-transitory machine-readable (e.g., computer-readable) storage media comprise any type of machine-readable storage medium, including floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, as opposed to media specifically designed or designated for carrying transitory, propagating signals.

In the foregoing specification, embodiments of the invention have been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A non-transitory computer-readable medium with instructions stored therein, the instructions, when executed by a processor, cause the processor to perform operations comprising:
   receiving a first request to compile a first set of program instructions coded in a first high-level language, the first high-level language a C language based object-oriented programming language;
   receiving a second request to compile a second set of program instructions related to the first set of program instructions, the second set of program instructions coded in a second high-level language including object-oriented elements and procedural elements, wherein second high-level language is not compatible with the C language;
   compiling the first set of program instructions and the second set of program instructions using a modular compilation system including multiple front-end compilers, the first set of program instructions compiled into a first intermediate representation of the first set of program instructions and the second set of program instructions compiled into a second intermediate representation of the second set of program instructions;
   linking the first and second intermediate representations; and
   compiling the first and second intermediate representations using a back-end compiler that is specific to a target processor.

2. The medium of claim 1 further comprising instructions to perform additional operations comprising:
   in response to the first request, compiling the first set of program instructions using a first front-end compiler having support for the first high-level language; and
   in response to the second request, compiling the second set of program instructions using a second front-end compiler having support for the second high-level language.

3. The medium of claim 1 wherein the first or second intermediate representation is an LLVM intermediate representation.

4. The medium of claim 1, further comprising instructions to perform additional operations including optimizing the first and second intermediate representations during a compile-time optimization.

5. The medium of claim 1, further comprising instructions to perform additional operations including optimizing the first and second intermediate representations during a link-time optimization.

6. The medium of claim 5, further comprising instructions to perform operations including optimizing the first and second intermediate representations in response to a request to optimize the program instructions during compilation.

7. The medium of claim 1, wherein compiling the second set of program instructions includes performing compile-time data-type overflow checking by default.

8. The medium of claim 1, wherein compiling the second set of program instructions includes performing compile-time data structure bounds checking by default.

9. The medium of claim 1, wherein compiling the second set of program instructions includes performing one or more compile-time type safety operations in conjunction with one or more type inference operations.

10. A system comprising:
    one or more processors coupled to memory;
    one or more non-transitory storage devices coupled to the memory and the one or more processors, the storage device including a first set of program instructions in a first high-level language and a second set of program instructions in a second high-level language;
    an application development system stored on the one or more storage devices, the application development system to build an application using the first set of program instructions and the second set of program instructions, the application development system including a modular compilation system having a first front-end compiler and a second front-end compiler, and additionally includes a linker to link symbolic references to functions in the first and second set of program instructions;
    wherein the first high-level language is a C language based object-oriented programming language and the second high-level language includes object-oriented elements and procedural elements; and
    wherein the second set of program instructions are not compatible with the C language and includes a data type provided by the second high-level language to indicate absence of a value of any type.

11. The system as in claim 10, wherein the first front-end compiler to compile the first set of program instructions into a first intermediate representation and the second front-end compiler to compile the second set of program instructions into a second intermediate representation.

12. The system as in claim 11, wherein the second front-end compiler to perform data structure bounds checking and data type overflow protection by default.

13. The system as in claim 12 further comprising an intermediate language optimizer to optimize the first and second intermediate representation.

14. The system as in claim 12 wherein the second set of program instructions includes a source file based access restriction to prevent access to logical elements from logical elements not defined within a common source file.

15. A computer-implemented method comprising:
    receiving a first request to compile a first set of program instructions to run on a target processor;
    in response to the first request, compiling the first set of program instructions using a front-end compiler, wherein the front-end compiler includes support for a first high-level language, wherein the first language is a C language based object-oriented programming language and wherein the first set of program instructions are compiled into a first intermediate representation of the first set of program instructions;
    receiving a second request to compile a second set of program instructions to run on the target processor, wherein the second set of program instructions are related to the first set of program instructions, wherein the second set of program instructions are coded in a second high-level language that includes object-oriented and procedural elements, wherein the second high-level language includes data type overflow protection by default, and wherein the second set of program instructions are not compatible with the C language;
    in response to the second request, compiling the second set of program instructions using the front-end compiler, wherein the front-end compiler includes support for the second high-level language, and wherein the second set of program instructions are compiled into a second intermediate representation of the second set of program instructions;
    linking the first and second intermediate representations, wherein linking the first and second intermediate representations includes optimizing the first and second intermediate representations in response to a compile-time request to optimize the program instructions; and compiling the first and second intermediate representations using a back-end compiler that is specific to the target processor.

16. The method as in claim 15 wherein the back-end compiler is a just-in-time compiler.

17. The method as in claim 15 wherein compiling the second set of program instructions includes performing compile-time data-type overflow checking and compile-time data structure bounds checking by default.

18. The method as in claim 15 wherein compiling the second set of program instructions includes an interpolated string.

19. The method of claim 15 wherein compiling the second set of program instructions includes performing one or more compile-time type safety operations in conjunction with one or more type inference operations.

20. The medium of claim 1, wherein the second set of program instructions includes data of a data type provided by the second high-level language to indicate absence of a value of any type.

21. The system as in claim 10, wherein the second set of program instructions additionally include data of a data type provided by the second high-level language to store a temporary group of related values.

22. The method of claim 15, wherein the second set of program instructions includes data of a first data type provided by the second high-level language to indicate absence of a value of any type and a second data type provided by the second high-level language to store a temporary group of related values.

* * * * *